Patented June 2, 1931

1,808,465

UNITED STATES PATENT OFFICE

ALFONS KLEMENC AND RUDOLF SCHOELLER, OF VIENNA, AUSTRIA, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF UREA

No Drawing. Application filed May 22, 1929, Serial No. 365,224, and in Austria August 6, 1926.

The present invention relates to the production of urea.

As is known, carbon oxysulphide and ammonia can be caused to react with each other with the formation of ammonium thiocarbamate. It is also known that ammonium thiocarbamate can be converted into urea. The said two reactions, however, cannot be made use of for working on an industrial scale, because according to the known methods the reactions proceed too slowly and are also attended with a great number of other difficulties.

We have now found that urea can be produced directly from carbon oxysulphide and ammonia and without an isolation of intermediarily formed ammonium thiocarbamate by causing reaction between carbon oxysulphide and ammonia to take place while at least one of the said two reagents is at least in part in a liquefied state, and then heating the reaction mixture under pressure.

The process according to the present invention may be carried out by liquefying the carbon oxysulphide and the ammonia either simultaneously or while they are mixed with each other. The preferred method of working consists in first liquefying the ammonia which has a higher boiling point than carbon oxysulphide, and then introducing gaseous carbon oxysulphide. Liquefaction of the said gases can be effected in any suitable way, for example by cooling to low temperatures and preferably while simultaneously applying pressure.

Under the said conditions the reaction between the two components rapidly yields solid dry ammonium thiocarbamate, without the use of solvents being necessary. The conversion of the intermediarily formed ammonium thiocarbamate is effected by heating under pressure and it may take place in the same apparatus as the formation of the ammonium thiocarbamate. In the said conversion into urea we prefer to operate at temperatures between 80 and 120° C.

The following examples will further illustrate the nature of the said invention which, however, is not limited thereto. The parts are by volume.

Example 1

7 parts of gaseous ammonia and thereafter about 4 parts of carbon oxysulphide are liquefied in an iron high pressure apparatus provided with a manometer and the necessary valves, by cooling the said apparatus with liquid air. The apparatus is then slowly heated to about 120° C. in an oil bath and kept at this temperature for about three hours. After this time the reaction is complete. The pressure in the high pressure apparatus is then about 36.4 atmospheres. After cooling, the gaseous hydrogen sulphide which produces the pressure in the apparatus, is released and the content of the apparatus dissolved in water. After filtering off any impurities (chiefly iron sulphide formed from the iron wall of the apparatus) the urea is separated in the usual manner. 69 to 70 per cent of the ammonia is converted into urea as results from the quantitative determination of the nitrogen by the method of Kjeldahl.

Example 2

5 parts of ammonia are liquefied in the apparatus referred to in Example 1, whereupon 2.6 parts of gaseous carbon oxysulphide are introduced. The apparatus is then heated for two hours to about 120° C. and at the end of the reaction the pressure in the apparatus is 18.5 atmospheres. The yield in urea amounts to 77.6 per cent of the ammonia introduced.

What we claim is:

1. The process of producing urea which comprises bringing together carbon oxysulphide and ammonia, in the absence of water, with at least part of at least one of the said components in a liquefied state, and then heating the mass under pressure to between about 80 and about 120° C.

2. The process of producing urea which comprises liquefying ammonia, introducing carbon oxysulphide into the liquefied ammonia, and heating the mixture under pressure to between about 80 and about 120° C.

In testimony whereof we have hereunto set our hands.

ALFONS KLEMENC.
RUDOLF SCHOELLER.